United States Patent
Leigh et al.

(10) Patent No.: US 10,394,288 B2
(45) Date of Patent: Aug. 27, 2019

(54) ALIGNMENT MEMBERS

(71) Applicant: Hewlett Packard Enterprise Development LP, Houston, TX (US)

(72) Inventors: Kevin Leigh, Houston, TX (US); Sunil Ganta, Cypress, TX (US); John Norton, Houston, TX (US); Arlen L. Roesner, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/816,834

(22) Filed: Nov. 17, 2017

(65) Prior Publication Data

US 2018/0095506 A1    Apr. 5, 2018

Related U.S. Application Data

(63) Continuation of application No. 15/283,032, filed on Sep. 30, 2016, now Pat. No. 9,836,096.

(51) Int. Cl.
*G11B 25/02* (2006.01)
*G06F 1/18* (2006.01)
*G06F 1/20* (2006.01)

(52) U.S. Cl.
CPC ............... *G06F 1/183* (2013.01); *G06F 1/20* (2013.01)

(58) Field of Classification Search
CPC ......... G11B 17/02; G11B 17/04; G11B 17/22; G11B 17/32; G11B 5/55; G11B 25/04; G07D 9/00
USPC ..... 361/679.54; 360/78.04, 78.12, 93, 98.07, 360/133; 720/621; 451/557
See application file for complete search history.

(56) References Cited

U.S. PATENT DOCUMENTS

| | | | |
|---|---|---|---|
| 3,556,382 A | | 1/1971 | Busler et al. |
| 3,786,454 A | * | 1/1974 | Lissner ............... G11B 5/5521 360/78.04 |
| 3,964,098 A | * | 6/1976 | Kramer ................ G11B 15/26 226/188 |
| 3,973,273 A | * | 8/1976 | Lissner ............... G11B 5/5521 360/133 |
| 4,022,370 A | | 5/1977 | Durney |
| 7,712,969 B2 | | 5/2010 | Song et al. |
| 7,974,098 B2 | | 7/2011 | Oki et al. |
| 8,104,977 B2 | | 1/2012 | Sone et al. |

(Continued)

FOREIGN PATENT DOCUMENTS

| | | |
|---|---|---|
| CN | 203631825 | 6/2014 |
| CN | 204230541 | 3/2015 |
| JP | 2006-228701 | 8/2006 |

OTHER PUBLICATIONS

PCT/ISA/KR, International Search Report and Written Opinion, dated Jul. 29, 2016, PCT/US2015/067409, 13 pages.

*Primary Examiner* — Xiaoliang Chen
(74) *Attorney, Agent, or Firm* — Hewlett Packard Enterprise Patent Department

(57) ABSTRACT

Example alignment members are provided herein. In one example, the alignment member includes a frame member, a stiffener member, a bracket member, and a spring member. The frame member includes a set of roller bushings. The stiffener member includes a set of cam members. The bracket member to receive the stiffener member. The spring member is connected to the stiffener member. The spring member to expand and contract based on the position of the set of roller bushings.

9 Claims, 13 Drawing Sheets

(56) References Cited

U.S. PATENT DOCUMENTS

| | | |
|---|---|---|
| 8,358,504 B2 | 1/2013 | McColloch et al. |
| 8,416,570 B2 | 4/2013 | Zeng et al. |
| 9,052,477 B2 | 6/2015 | Oki |
| 9,709,763 B2 | 7/2017 | Wang et al. |
| 2002/0193062 A1* | 12/2002 | Abe ................... G07D 1/00 453/41 |
| 2003/0141090 A1 | 7/2003 | Kruger et al. |
| 2003/0171022 A1 | 9/2003 | Distad et al. |
| 2005/0289569 A1* | 12/2005 | Jung ............ G11B 17/0404 720/621 |
| 2006/0093287 A1 | 5/2006 | Yoshikawa et al. |
| 2007/0041687 A1 | 2/2007 | Mizue et al. |
| 2007/0119328 A1* | 5/2007 | Maglio ............ A01B 79/005 102/334 |
| 2007/0212149 A1* | 9/2007 | Ota ................... B41J 17/32 400/208 |
| 2009/0016685 A1 | 1/2009 | Hudgins et al. |
| 2009/0321301 A1 | 12/2009 | Song et al. |
| 2012/0023510 A1* | 1/2012 | Ogawa ........... G11B 17/0404 720/621 |
| 2012/0269486 A1 | 10/2012 | Ishii |
| 2013/0210275 A1 | 8/2013 | Fish et al. |
| 2015/0180578 A1 | 6/2015 | Leigh et al. |
| 2019/0018199 A1 | 1/2019 | Leigh et al. |

\* cited by examiner

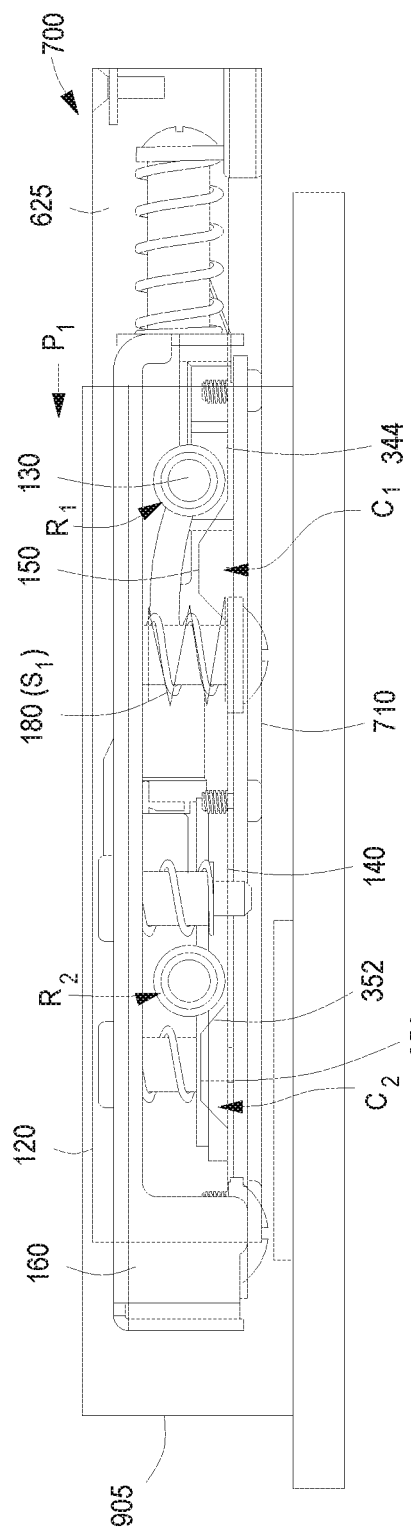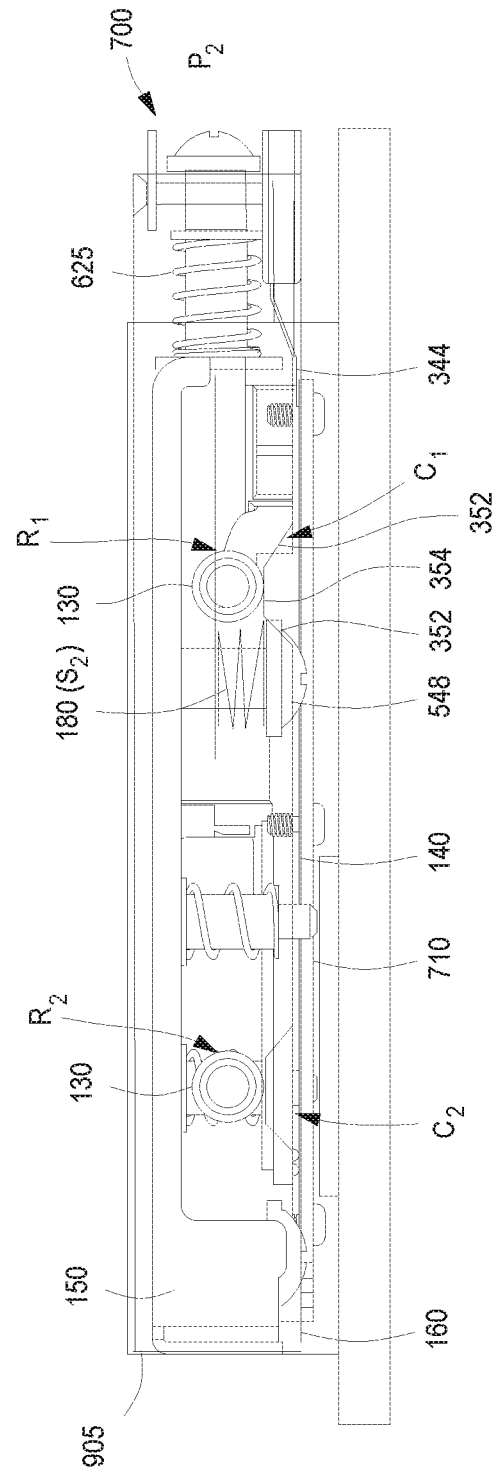

US 10,394,288 B2

ALIGNMENT MEMBERS

PRIORITY INFORMATION

This application is a continuation of U.S. application Ser. No. 15/283,032 filed on Sep. 30, 2016. The contents of which are incorporated herein by reference in its entirety.

BACKGROUND

Computing systems may include a system board with a number of socket connectors to couple module boards to the system board. The module boards can be hot-pluggable transceiver modules used for network data communications. The system board may be behind a faceplate.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

FIGS. 9-10 illustrate side views of the module board assembly of FIG. 7 according to examples;

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Module boards, such as hot-pluggable transceivers, are mated to a system board using a staged contact mating sequence. For example, group, power, and signals are mating in a consistent and specific order. Many times there are size limitations on the module boards, for example, large pin-count Application-Specific Integrated Circuits (ASICs) use different height contacts, which are more expensive and can cause inconsistent mating forces.

An alignment member to mate a module board of varying sizes is provided herein. The alignment member includes a frame member, a stiffener member, a bracket member, and a spring member. The frame member includes a set of roller bushings. The stiffener member includes a set of cam members. The bracket member receives the stiffener member. The spring member is connected to the stiffener member. The spring member to expand and contract based on the position of the set of roller bushings.

Figure 1:
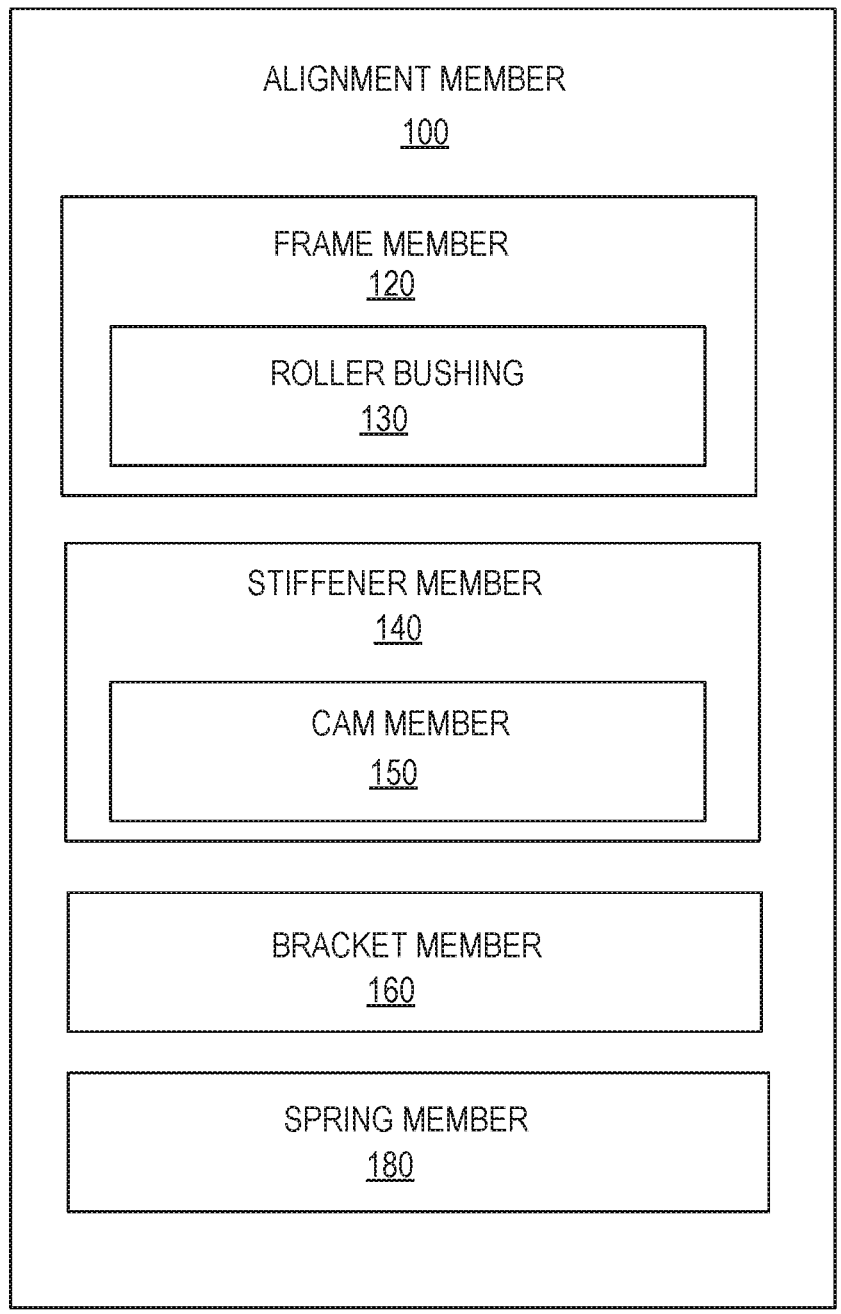
FIG. 1 illustrates a block diagram of an alignment member according to an example.

FIG. 1 illustrates a block diagram of an alignment member 100 according to an example. The alignment member 100 includes a frame member 120, a stiffener member 140, a bracket member 160, and a spring member 180. The frame member includes a set of roller bushings 130. The stiffener member 140 includes a set of cam members 150. The bracket member 160 receives the stiffener member 140. The spring member 180 is connected to the stiffener member 140. The spring member 180 expands and contracts based on the position of the set of roller bushings 130.

Figure 2:
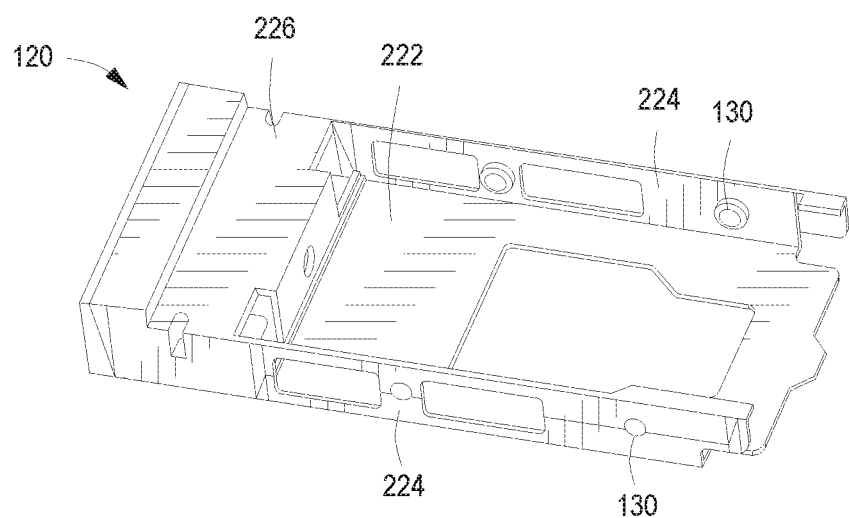
FIG. 2 illustrates a frame member usable with the alignment member of FIG. 1 according to examples.

FIG. 2 illustrates a frame member 120 usable with the alignment member 100 of FIG. 1 according to an example. As illustrated, the frame member 120 includes a planar housing 222 with two side walls 224 extending from the planar housing 222 and a front panel 226 attached to the planar housing 222. The roller bushings 130 are attached to the two side walls 224 and are illustrated as four roller bushings 130, two on each side wall 224. As further illustrated in FIGS. 9-10 below, the roller bushings 130 apply a force on the stiffener member 140 to move the spring member 180 when the roller bushings 130 and the cam members 150 engage.

Figure 4:
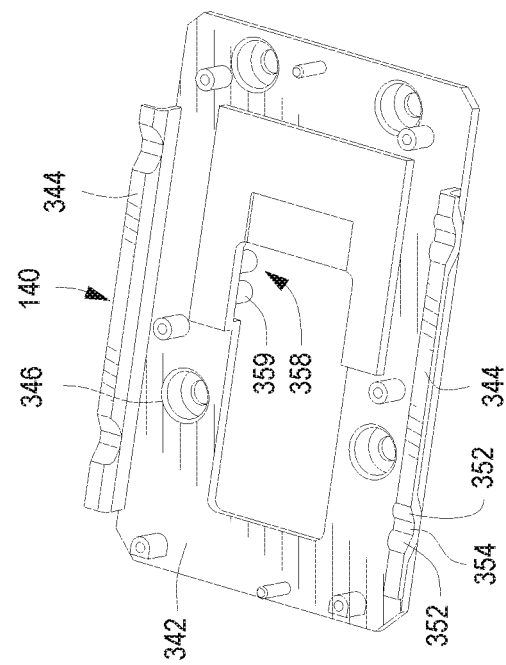
FIGS. 3-4 illustrate isometric views of a stiffener member usable with the alignment member of FIG. 1 according to examples.
Figure 3:
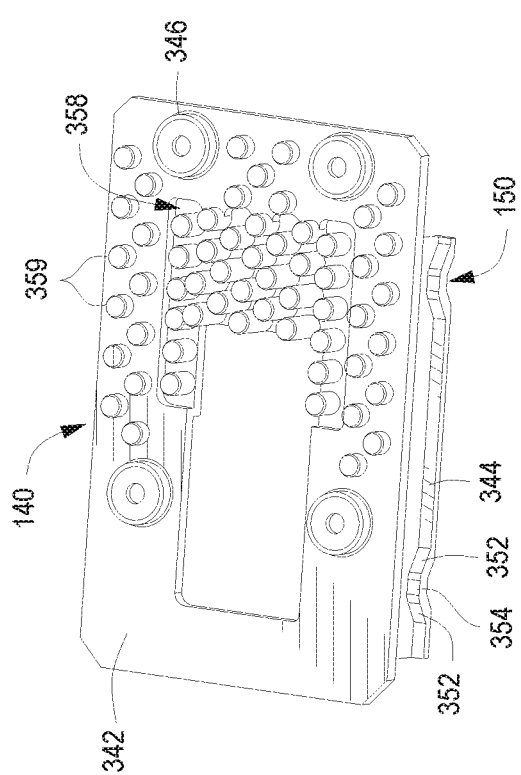

FIGS. 3-4 illustrate isometric views of the stiffener member usable with the alignment member of FIG. 1 according to examples. FIG. 3 illustrates a top view of the stiffener member 140, and FIG. 4 illustrates a bottom view of the stiffener member 140. The stiffener member 140 as illustrated includes a planar surface 342 with rail members 344 on each side. The rail members 344 include four cam members 150 with two cam members 150 integrated into each rail member 344. As illustrated the set of cam members 150 are shaped on the stiffener member 140; however, the cam members 150 may also be attached to the stiffener member 140. The set of cam members 150 may come in a variety of shapes and designs that provide a ramp 352 for the set of roller bushings 130. For example, FIGS. 3-4 illustrate the ramp 352 as two ramps 352 on both sides of a flat surface 354 where the roller bushings 130 can sit.

Figure 8:
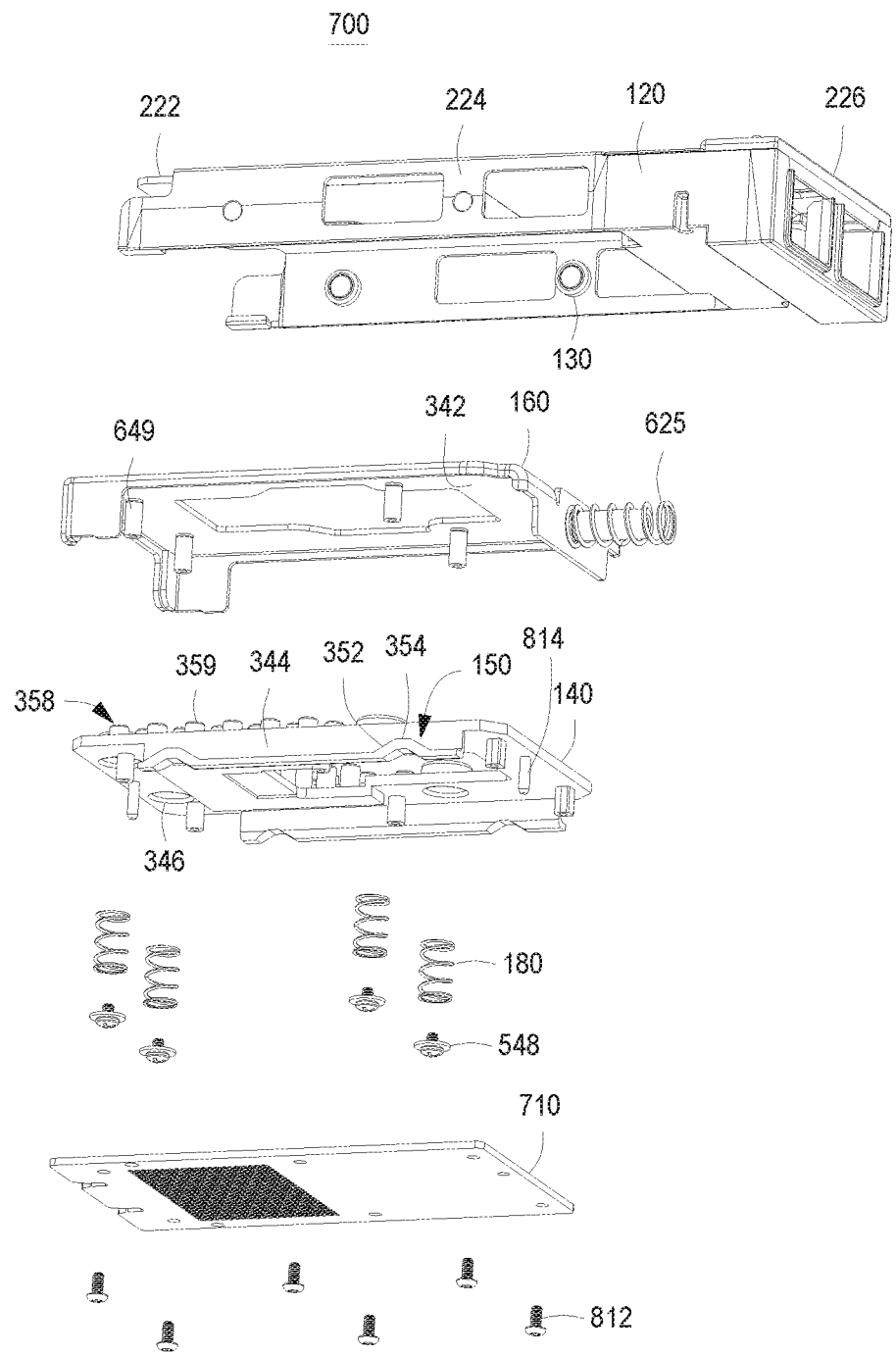
FIG. 8 illustrates an exploded view of the module board assembly of FIG. 7 according to an example.

The stiffener member 140 is illustrated to include spring apertures 346 to receive a spring member 180 and control vertical movement of the stiffener member 140. The spring member 180 provides a vertical degree of freedom of motion and may also couple the stiffener member 140 and the bracket member 160 in a horizontal degree of freedom of motion. Horizontal movement of the stiffener member 140 coupled to the bracket member 160 may be controlled using a loading spring (illustrated in FIGS. 9-10) attached to the bracket member 160. Examples of the loading spring include leaf springs 525 as illustrated in FIG. 5 and compression springs 625 as illustrated in FIGS. 6 and 8-9.

The stiffener member 140 as illustrated also includes heat sink members 358 integrated into the planar surface 342 of the stiffener member 140 as illustrated in FIGS. 3-4 as pillars 359 directly in contact with the ASIC or alternatively includes a separate heat sink directly attached to the ASIC.

Figure 6:
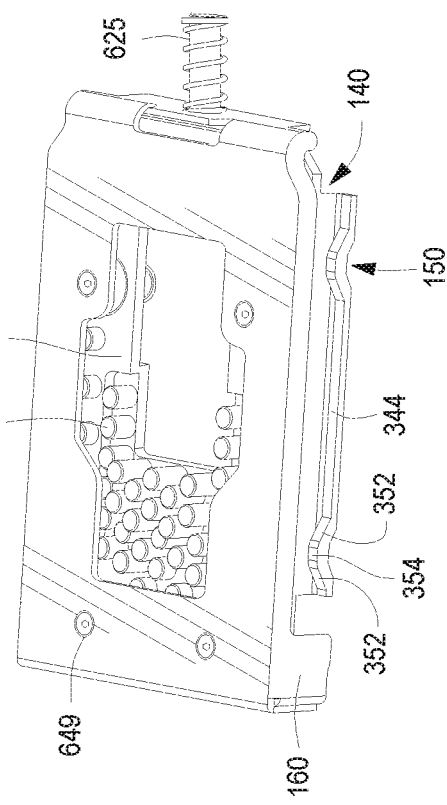
FIGS. 5-6 illustrate isometric views of a bracket, stiffener, and spring member usable with the alignment member of FIG. 1 according to an example.
Figure 5:
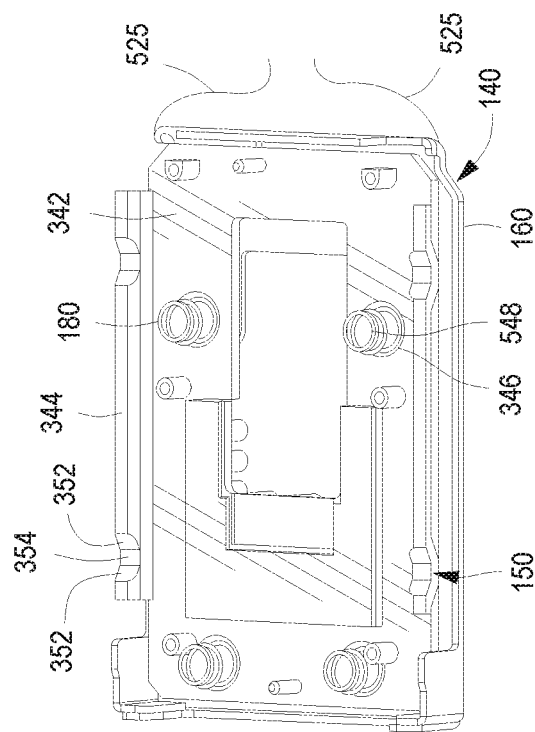

FIGS. 5-6 illustrate isometric views of the bracket member 160 and the stiffener member 140 usable with the alignment member 100 of FIG. 1 according to examples. FIG. 5 illustrates a bottom view of the bracket member 160 and the stiffener member 140. In FIG. 5, the stiffener member 140 attaches to the bracket member 160 via a spring member 180 with the set of cam members 150 visible. The spring apertures 346 are illustrated as having a spring member 180 therein and a washer 548 to hold the spring member 180 in place. FIG. 6 illustrates a top view of the bracket 160 and the stiffener member 140. In FIG. 6, the rail member 344 and the cam members 150 are illustrated with the ramps 352 and a flat surface 354. As illustrated in FIG. 6, the bracket member 160 covers the stiffener member 140 and leaves an opening for the rail member 344 and the set of cam members 150 to form a track that receives the roller bushings 130 and connects the bracket member 160 and the stiffener member 140 to the frame member 120. The stiffener member 140 and the bracket member 160 are connected using standoffs 649, upon which the stiffener member 140 vertically slides.

Figure 7:
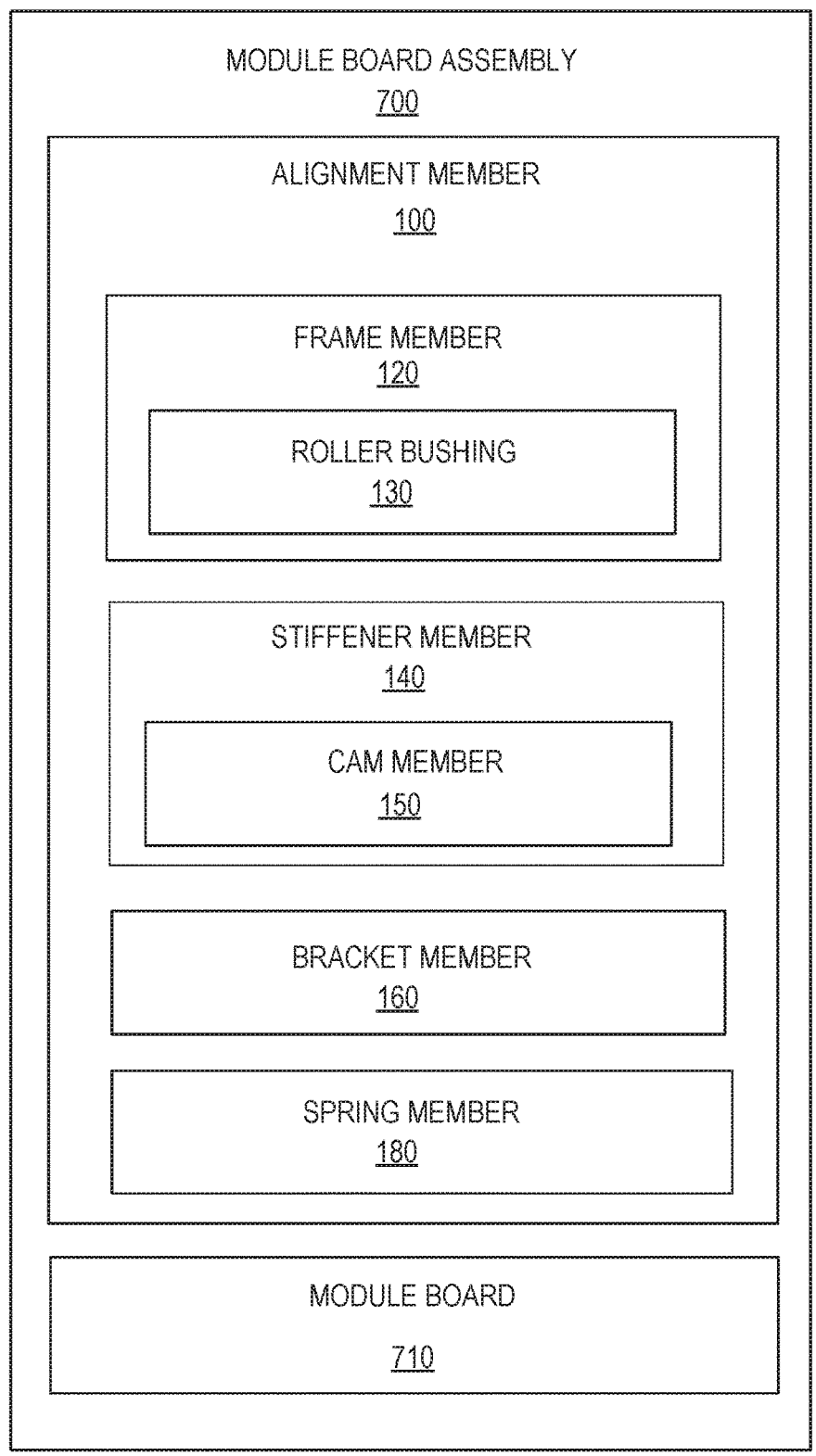
FIG. 7 illustrates a block diagram of a module board assembly according to an example.

FIG. 7 illustrates a block diagram of a module board assembly 700 to mate with a socket on a system board according to an example. FIG. 8 illustrates an exploded view of the module board assembly 700 of FIG. 7 according to an example. The module board assembly 700 includes an alignment member 100 and module board 710. The alignment member 100 includes a frame member 120, a stiffener member 140, a bracket member 160, and a spring member 180. The frame member 120 includes a set of roller bushings 130 connected thereto. The stiffener member 140 includes a set of cam members 150 attached thereto. The bracket member 160 to receive the stiffener member 140. The spring member 180 couples the stiffener member 140 and the bracket member 160. The spring member 180 to control vertical movement of the stiffener member 140 based on the horizontal position of the set of roller bushings 130. The module board 710 is connected to the stiffener member 140 by using fasteners 812 and fastener posts 814, which align and mate the module board 710 with the socket on the system board based on the position of the stiffener member 140.

FIGS. 9-10 illustrate side views of the module board assembly of FIG. 7 according to examples. Referring to FIG. 9, the module board assembly 700 in a first position, $P_1$, with the frame member 120 not fully inserted. This position may also be referred to an uninstalled position. Position $P_1$ occurs prior to mating the module board 710 with the socket on the system board. In FIG. 9, the set of roller bushings 130 are positioned on the rail member 344 of the stiffener member 140, and is horizontally positioned not to engage with the ramp 352. In position $P_1$, the spring member 180 is illustrated in an uncompressed state, $S_1$. In the uncompressed state, $S_1$, illustrated, the spring member 180 remains extended when the set of roller bushings 130 are not in contact with any of the cam members 150. The spring member 180 holds the stiffener member 140 attached to the module board 710 in an unmated state, i.e., the module board 710 is not in a position to mate with the system board or system board socket.

Referring to FIG. 10, the module board assembly 700 is in a second position, $P_2$, with the frame 120 fully inserted. Position $P_2$ is the position that mates the module board 710 with the socket on the system board. This position may also be referred to as an installed position. In FIG. 10, the set of roller bushings 130 are positioned on the rail member 344 of the stiffener member 140, and are horizontally engaged on a flat surface 354. For example, the ramp 352 may include two ramps with the flat surface 354 therebetween. In position $P_2$, the spring member 180 is illustrated in a compressed state, $S_2$. The spring member 180 contracts when at least one roller bushing of the set of roller bushings 130 contacts at least one cam member 150 of the set of cam members 150. The spring member 180 compresses in position $P_2$ to move the stiffener member 140 vertically and place the stiffener member 140 attached to the module board 710 in a mated state, i.e., the module board 710 is in a position to mate with the system board or system board socket.

Other variations of the mating sequence may also be used. For example, the size, number, and position of the roller bushings 130 and/or cam members 150 may be varied. This will allow a variety of module boards 710 to mate with system boards that typically include socket contacts of the same height for lower cost and more consistent mating forces. FIGS. 9-10 illustrate the module board 710 dropping down in a plane parallel to the socket; however, the module board 710 may be inserted at an angle to engage the contacts on the socket in sequence. For example, first, mating ground row contacts; second, mating power row contacts; and third, mating differential signals and additional grounds. To mate the module board 710 at an angle, the position of the cam members 150 may be adjusted such that a first pair of roller bushings 130 engage with a first pair of cam members 150 before a second pair of roller bushings 130 engage with a second pair of cam members 150 to form the angle. For example, once the second pair of roller bushings 130 engage with the second pair of cam members 150 the first and second row of contacts, e.g., the ground row contacts and power row contacts, will already be mated and then, the final row of contacts, e.g., the differential signals and additional grounds, may be sequentially mated.

As illustrated in FIGS. 9-10, the frame member 120 moves horizontally within the module board assembly 700 as the stiffener member 140 moves vertically to mate the module board 710 with the system board. For example, a pre-loading spring, such as a compression spring 625, may be used to provide horizontal movement of the frame member 120 connected to the module board assembly 700. A leaf spring or other manual mechanisms may also be used to provide the horizontal movement. The spring member 180 controls the vertical movement. FIGS. 9-10 illustrate the spring member 180 positioned between a retaining member, such as a washer 548 and the stiffener member 140. For example, as illustrated in FIG. 5, the spring apertures 346 receives a spring member 180 and the washer 548 provides a stop for the spring member 180.

The compression spring 625 is illustrated between the frame member 120 and the bracket member 160 that is coupled to the stiffener member 140 in a position where the roller bushings 130 are not engaged with the cam members 150. In a first position, $P_1$, the compression spring 625 positions the roller bushings 130 not engaged with the cam members 150. During installation, the roller bushings 130 engage with the cam members 150, and the module board assembly 700 moves horizontally until the module board assembly 700 contacts the cage member 905. Two pairs of roller bushings 130 may engage with the cam members 150 simultaneously or sequentially. For example, in FIG. 10, cam members $C_2$ may engage with roller bushings 130 $R_2$ before cam members 150 $C_1$ engage with roller bushings 130 $R_1$ for sequential mating by adjusting the ramp 352. Alternatively, the cam members $C_1$ and $C_2$ may engage with roller bushings 130 $R_1$ and $R_2$ for simultaneous mating. In either way, the roller bushings 130 $R_1$ and $R_2$ will both engage with the cam members $C_1$ and $C_2$ and remain on the flat surface 354 to complete the mating between the module board 710 and the system board. As the module board assembly 700 contacts the cage member 905, the compression spring 625 compresses and maintains the engaged position of the roller bushings 130 with the cam members 150. As long as the module board assembly 700 contacts the cage member 905, the compression spring 625 maintains the horizontal position of the module board assembly 700 and remains mated.

Figure 11:
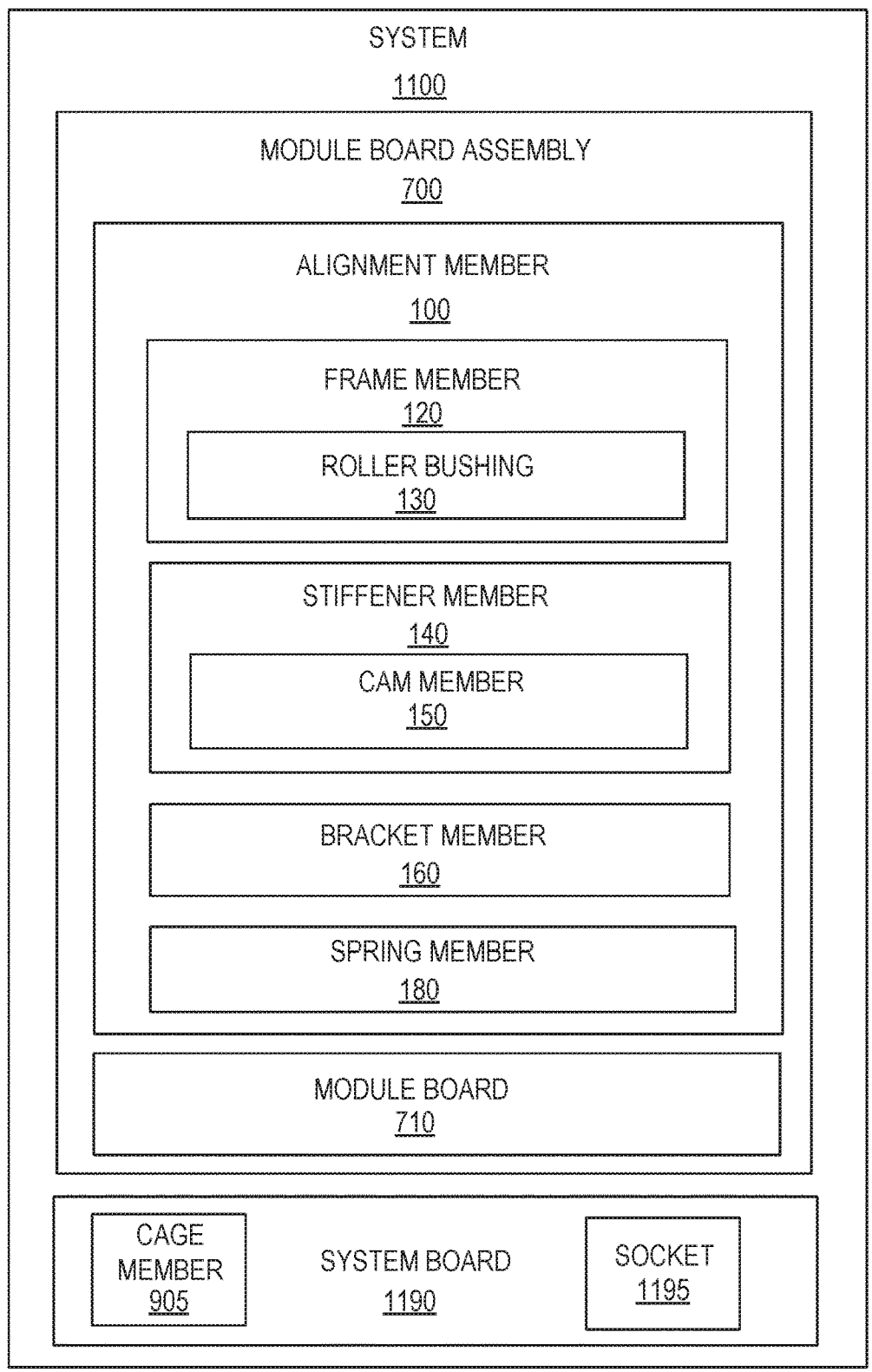
FIG. 11 illustrates a block diagram of a system to mate a module board assembly with a socket on a system board according to an example.

FIG. 11 illustrates a block diagram of a system 1100 to mate a module board assembly 700 with a socket on a system board 710 according to an example. The system 1100 includes the module board assembly 700 and the system board 1190. The module board assembly 700 includes an alignment member 100 and a module board 710. The alignment member 100 includes a frame member 120, a stiffener member 140, a bracket member 160, and a spring member 180. The frame member 120 includes a set of roller bushings 130 connected thereto. The stiffener member 140 includes a set of cam members 150 attached thereto. The bracket member 160 to receive the stiffener member 140. The spring member 180 is connected to the stiffener member 140. The spring member 180 to control vertical movement of the stiffener member 140 based on the position of the set of roller bushings 130. The module board 710 is connected to the stiffener member 140. The system board 1190 includes a socket 1195 to mate with the module board 710 and a cage member 905 to receive the module board assembly 700.

Figure 12:
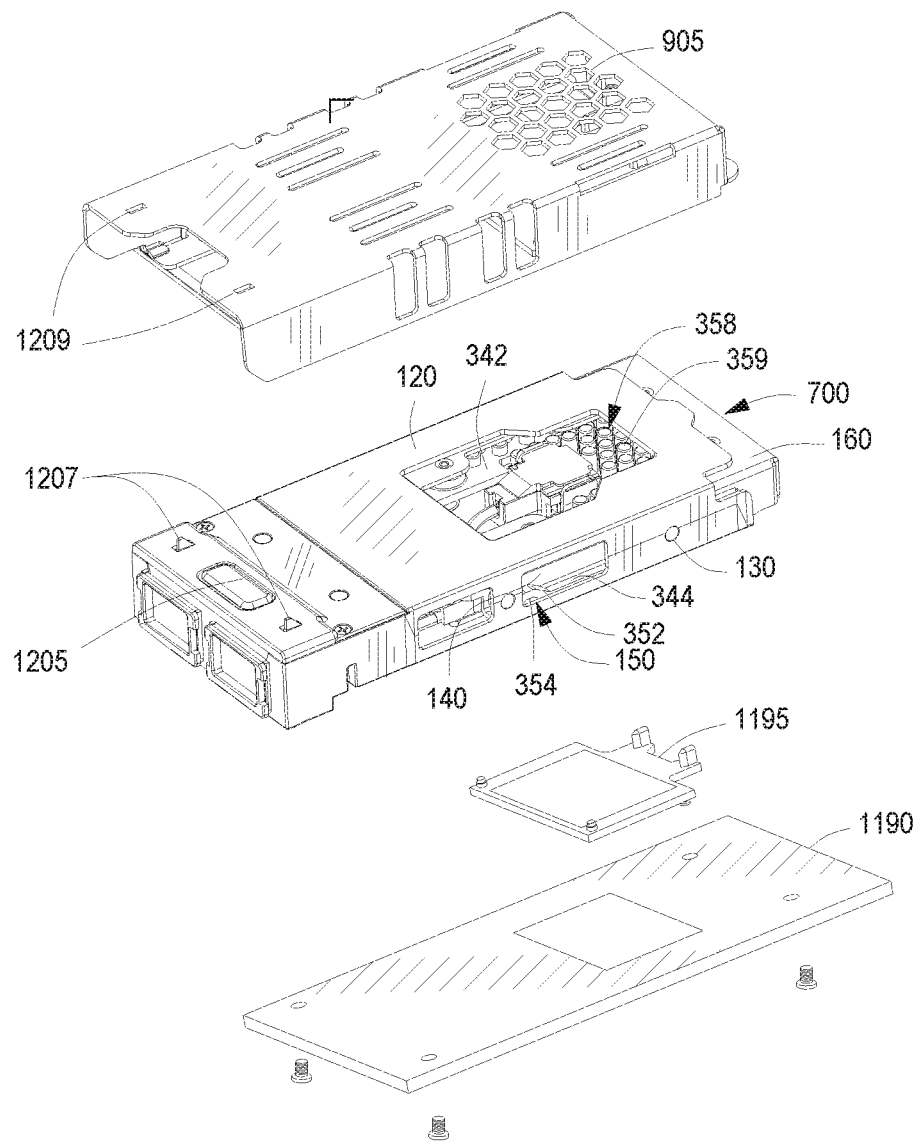
FIG. 12 illustrates an exploded view of the system of FIG. 11 according to an example.
Figure 13:
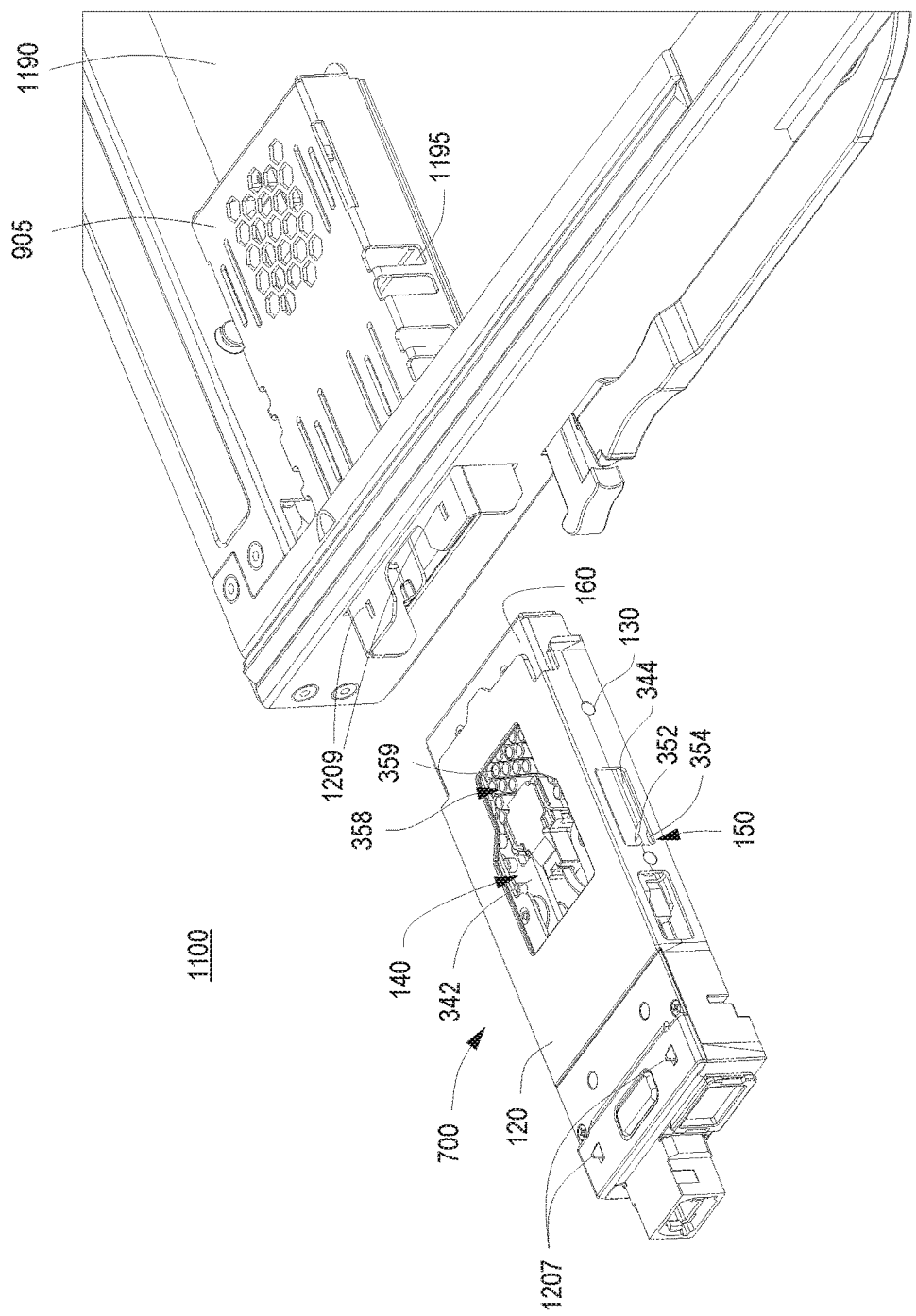
FIG. 13 illustrates an isometric view of a portion of the system of FIG. 11 with the module board assembly uninstalled according to examples.
Figure 14:
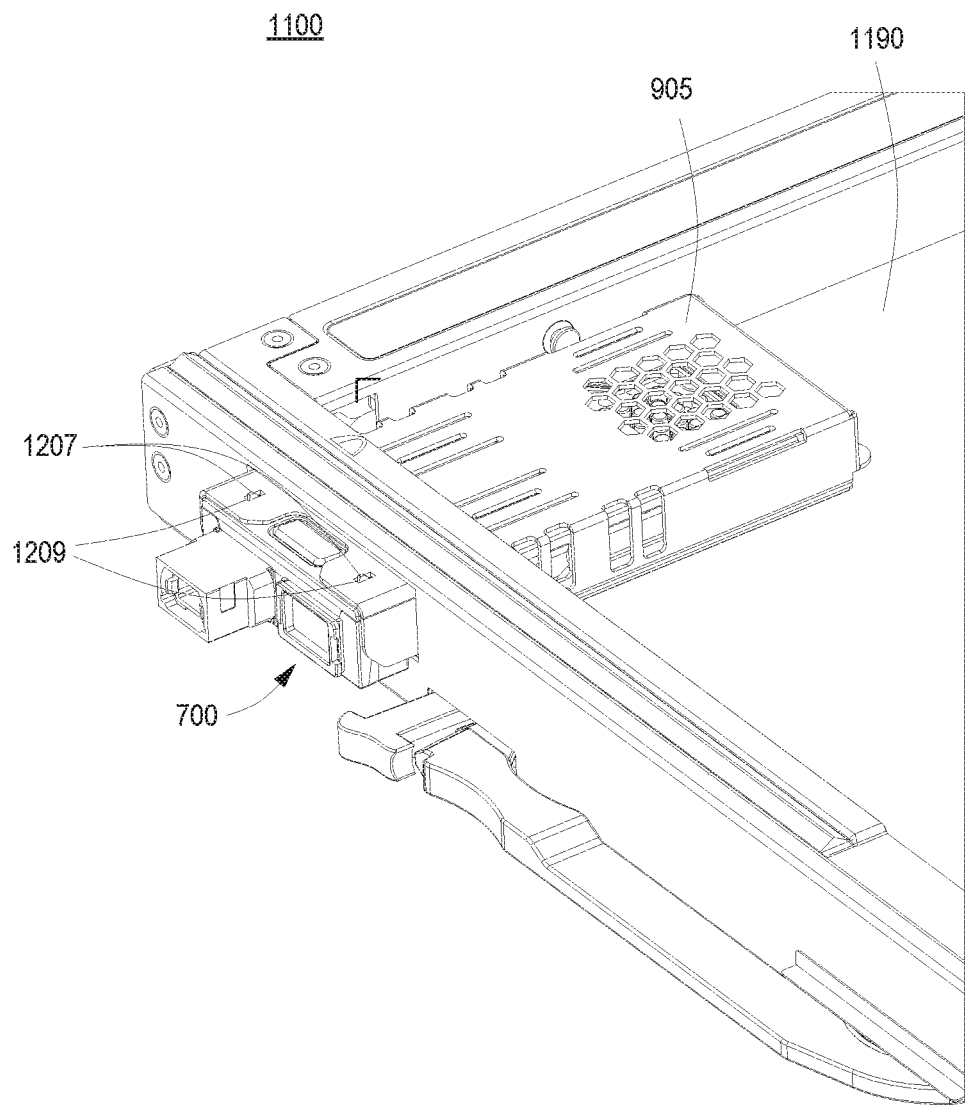
FIG. 14 illustrates a isometric view of a portion of the system of FIG. 11 with the module board assembly installed according to an example.

FIG. 12 illustrates an exploded view of the system 1100 of FIG. 11 according to an example. The system 1100 includes the module board assembly 700, the system board 1190, the socket member 1195, and the cage member 905 to receive the module board assembly 700 attachable to the system board 1190. FIGS. 13-14 are assembled views of the system 1100. FIG. 13 illustrates an isometric view of a portion of the system 1100 of FIG. 11 with the module board assembly 700 uninstalled according to examples. FIG. 14 illustrates an isometric view of a portion of the system 1100 of FIG. 11 with the module board assembly 700 installed according to an example.

Figure 15:
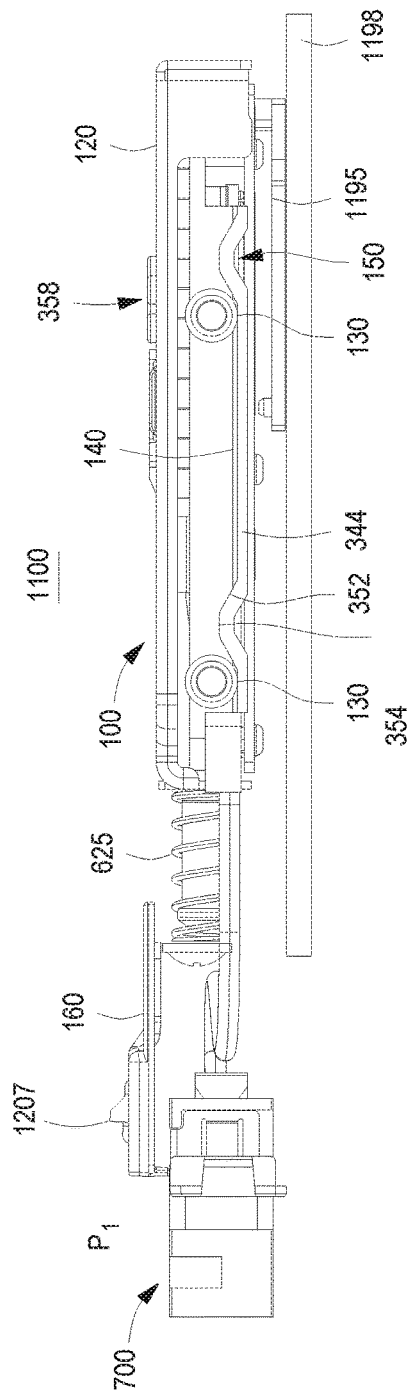
FIG. 15 illustrates a side view of the system of FIG. 11 with the roller bushings not in contact with the cam members according to an example.
Figure 16:
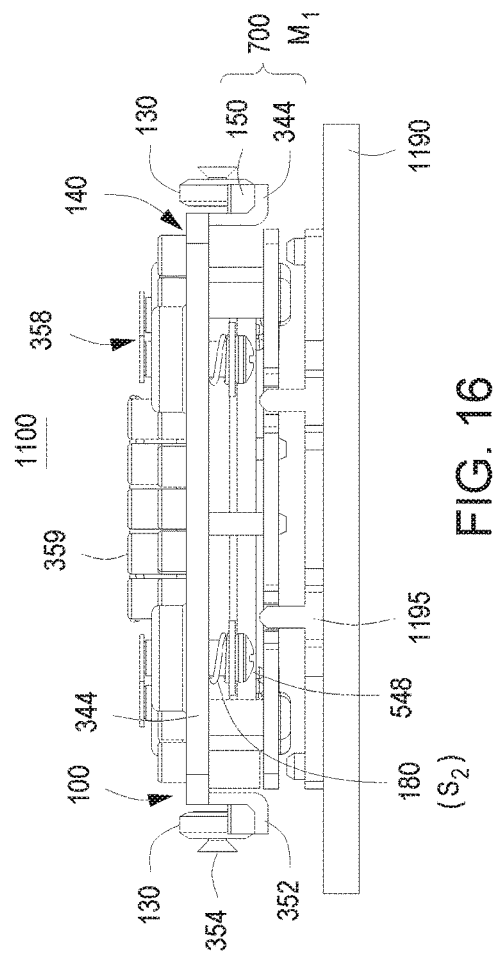
FIG. 16 illustrates a rear view of the system of FIG. 11 with the roller bushings not in contact with the cam members according to an example

FIG. 15 illustrates a side view of the system 1100 of FIG. 11 with the roller bushings 130 not in contact with the cam members 150 according to an example. FIG. 16 illustrates a rear view of the system 1100 of FIG. 11 with the roller bushings 130 not in contact with the cam members 150 according to an example. The module board 710 is connected to an underside of the stiffener member 140. Referring to FIGS. 15-16, the module board assembly 700 is in a first position, $P_1$, with the frame member 120 not fully inserted. The set of roller bushings 130 are positioned on the rail member 344 of the stiffener member 140, and is horizontally positioned not to engage with the ramp 352. The set of roller bushings 130 are not in contact with any of the cam members 150. The spring member 180 holds the stiffener member 140 connected to the module board 710 in an unmated state, $M_1$, i.e., the module board 710 is not in a position to mate with the system board or system board socket. The compression spring 625 also maintains the module board assembly 700 horizontally. The locking tabs 1207 are not positioned to engage with slots 1209 on the cage member 905.

Figure 17:
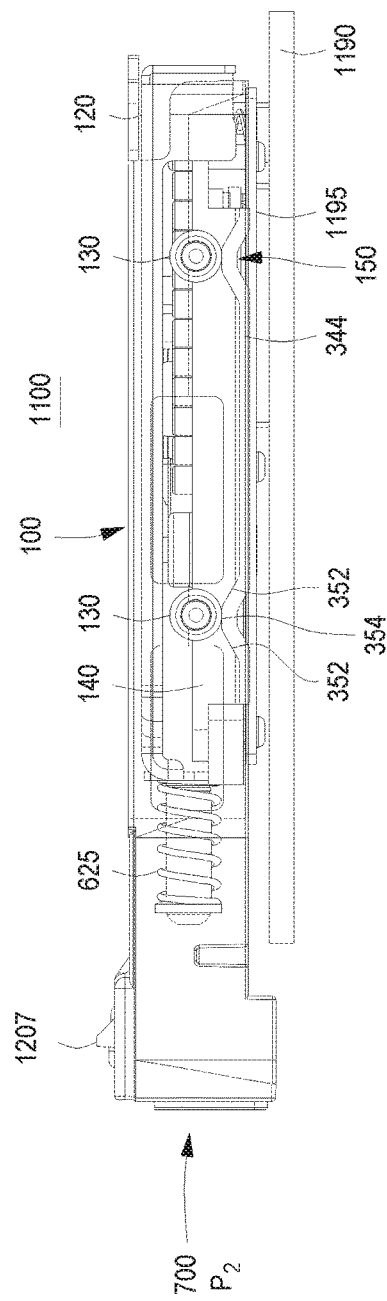
FIG. 17 illustrates a side view of the system of FIG. 11 with the roller bushings in contact with the cam members according to an example.
Figure 18:
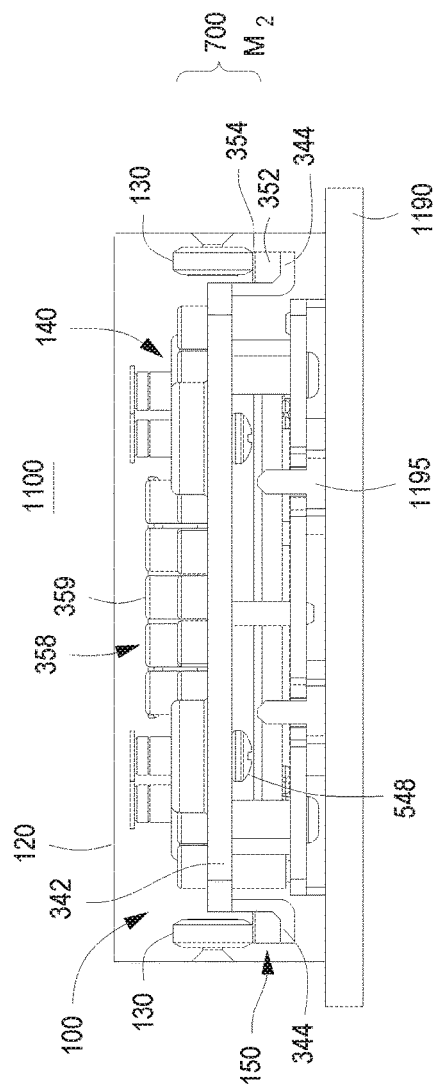
FIG. 18 illustrates a rear view of the system of FIG. 11 with the roller bushings in contact with the cam members according to an example.

FIG. 17 illustrates a side view of the system 1100 of FIG. 11 with the roller bushings 130 in contact with the cam members 150 according to an example. FIG. 18 illustrates a rear view of the system 1100 of FIG. 11 with the roller bushings 130 in contact with the cam members 150 according to an example. Referring to FIGS. 17-18, the module board assembly 700 is in a second position, $P_2$, with the frame 120 fully inserted. Position $P_2$ is the position that mates the module board 710 with the socket on the system board. This position may also be referred to as an installed position. In FIG. 10, the set of roller bushings 130 are positioned on the rail member 344 of the stiffener member 140, and are horizontally positioned to engage with the set of cam members 150. The set of cam members 150 include two ramps 352 with a flat surface 354 there between. At least one roller bushing of the set of roller bushings 130 contacts at least one cam member 150 of the set of cam members 150 and the set of roller bushings 130 apply pressure to the stiffener member 140, which causes the spring member 180 to contract. The spring member 180 compresses in position $P_2$ to move the stiffener member 140 vertically and place the stiffener member 140 connected to the module board 710 in a mated state, $M_2$, i.e., the module board 710 is in a position to mate with the system board 1190 or system board socket, i.e., socket 1195.

The compression spring 625 engages with the cage member 905 and compresses to maintain the horizontal position of the module board assembly 700. The locking tabs 1207 engage with the slots 1209 on the cage member 905 to keep the compression spring 625 compressed. To remove the module board assembly 700, the locking tabs 1207 may be depressed to release compression on the compression spring 625. Release of the locking tabs 1207 moves the set of roller bushings 130 away from the set of cam members 150, i.e., position $P_2$, as illustrated in FIGS. 17-19, and towards position $P_1$, as illustrated in FIGS. 15-16. The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be examples. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A module board assembly, comprising:
an alignment member including:
a frame member including a set of roller bushings;
a stiffener member including a set of cam members;
a bracket member to receive the stiffener member; and
a spring member connected to the stiffener member to apply force to the stiffener member based on the vertical position of the stiffener member relative to the bracket member, which is controlled by the horizontal position of the set of roller bushings relative to the stiffener member; and
a module board connected to the stiffener member.

2. The module board assembly of claim 1, wherein the spring member is positioned between a retaining member and the stiffener member, the retaining member is connected to the bracket member.

3. The module board assembly of claim 1, wherein each cam member of the set of cam members comprise two ramps with a flat surface between the two ramps.

4. The module board assembly of claim 1, wherein the spring member expands when the set of roller bushings are not in contact with the set of cam members, and the spring member contracts when one roller bushing of the set of roller bushings is in contact with one cam member of the set of cam members.

5. The module board assembly of claim 1, further comprising a pre-loading spring to control horizontal movement of the bracket member relative to the frame member.

6. A system, comprising:
an alignment member that includes:
a frame member including a set of roller bushings;
a stiffener member including a set of cam members;
a bracket member to receive the stiffener member; and
a spring member connected to the stiffener member to apply force to the stiffener member based on the vertical position of the stiffener member relative to the bracket member, which is controlled by the horizontal position of the set of roller bushings relative to the stiffener member;
a module board connected to the stiffener member; and
a system board including a socket to mate with the module board and a cage member to receive the alignment member.

7. The system of claim 6, wherein the module board is connected to an underside of the stiffener member.

8. The system of claim 6, wherein the set of roller bushings engage the stiffener member such that, as the frame member is moved horizontally relative to the bracket member, the set of roller bushings engage the set of cam members and thereby cause the stiffener member to move vertically relative to the bracket member, which causes the spring member to compress.

9. The system of claim 8, further comprising a pre-loading spring to apply force to the bracket member based on the horizontal position of the frame member relative to the bracket member such that, when the alignment member is in an installed state in the cage member, the set of roller bushings are maintained in engagement with the set of cam members.

\* \* \* \* \*